United States Patent [19]

Wessel et al.

[11] 4,265,200

[45] May 5, 1981

[54] METHOD AND APPARATUS FOR CONTROLLING THE ONSET OF FUEL INJECTION IN DIESEL ENGINES

[75] Inventors: Wolf Wessel, Oberriexingen; Gerhard Engel, Stuttgart, both of Fed. Rep. of Germany

[73] Assignee: Robert Bosch GmbH, Stuttgart, Fed. Rep. of Germany

[21] Appl. No.: 853,669

[22] Filed: Nov. 21, 1977

[30] Foreign Application Priority Data

Nov. 23, 1976 [DE]  Fed. Rep. of Germany ....... 2653046

[51] Int. Cl.³ ............................................. F02M 39/00
[52] U.S. Cl. ..................................... 123/501; 123/487
[58] Field of Search ................ 123/139 AP, 139 AQ, 123/139 AY, 139 AF, 32 EA, 32 EB, 32 EC, 32 ED, 32 AE, 32 AL, 32 JT; 364/424, 431

[56] References Cited

U.S. PATENT DOCUMENTS

| | | | |
|---|---|---|---|
| 3,796,197 | 3/1974 | Locher et al. | 123/139 AP |
| 3,914,580 | 10/1975 | Watson et al. | 123/32 EB |
| 3,934,430 | 1/1976 | Fuso | 123/139 AP |
| 3,945,350 | 3/1976 | Ford | 123/32 EC |
| 4,019,478 | 4/1977 | Hobo et al. | 123/139 AP |
| 4,033,310 | 7/1977 | Nicolls | 123/139 AP |
| 4,073,270 | 2/1978 | Endo | 123/32 EC |
| 4,082,069 | 4/1978 | Mayer | 123/32 EB |

*Primary Examiner*—Gerald L. Brigance
*Attorney, Agent, or Firm*—Edwin E. Greigg

[57] ABSTRACT

There is described a method and apparatus for use in association with the fuel injection pumps of Diesel engines to time the moment of injection. The method and apparatus described relate to a closed-loop control system which engages a final control element in the fuel injection pump that changes the injection timing, i.e. the onset of fuel delivery and, hence, the onset of fuel injection. The controlled variable is the moment of fuel injection, detected by suitable means placed near the injection valves. A set-point value for this instant is derived on the basis of stored data which correlate the correct moment of injection as a function of engine speed with various optimum conditions, for example, low fuel consumption, low smoke generation, low noise, etc. The selection of the proper characteristic curve from the stored data set is made automatically or manually. The time of occurrence of the actual value pulse and the time of the set-point pulse are compared, for example, by converting the former to analog form, and the resulting control deviation is obtained as a preferably digital counter content which is used to engage the final control element to reduce the deviation.

38 Claims, 7 Drawing Figures

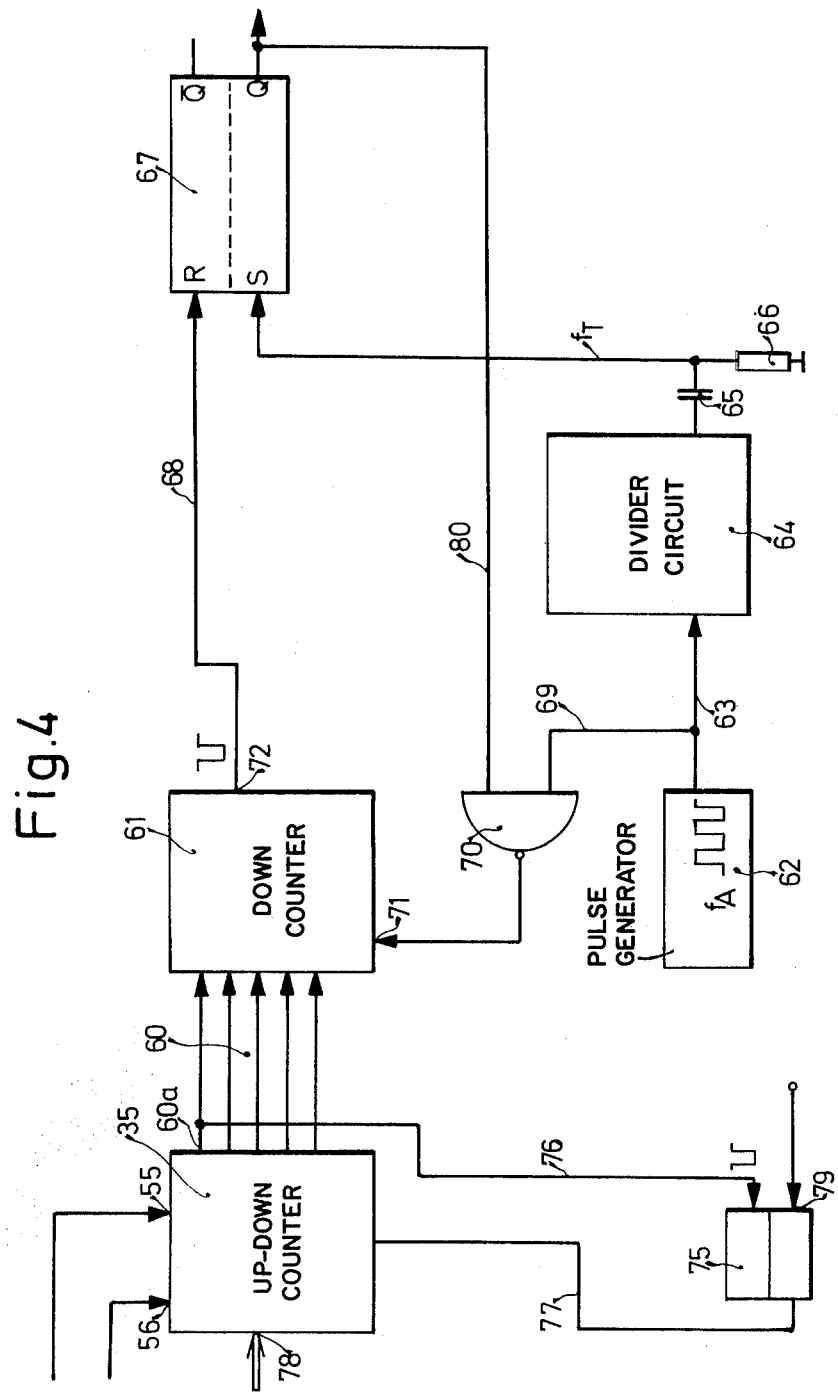

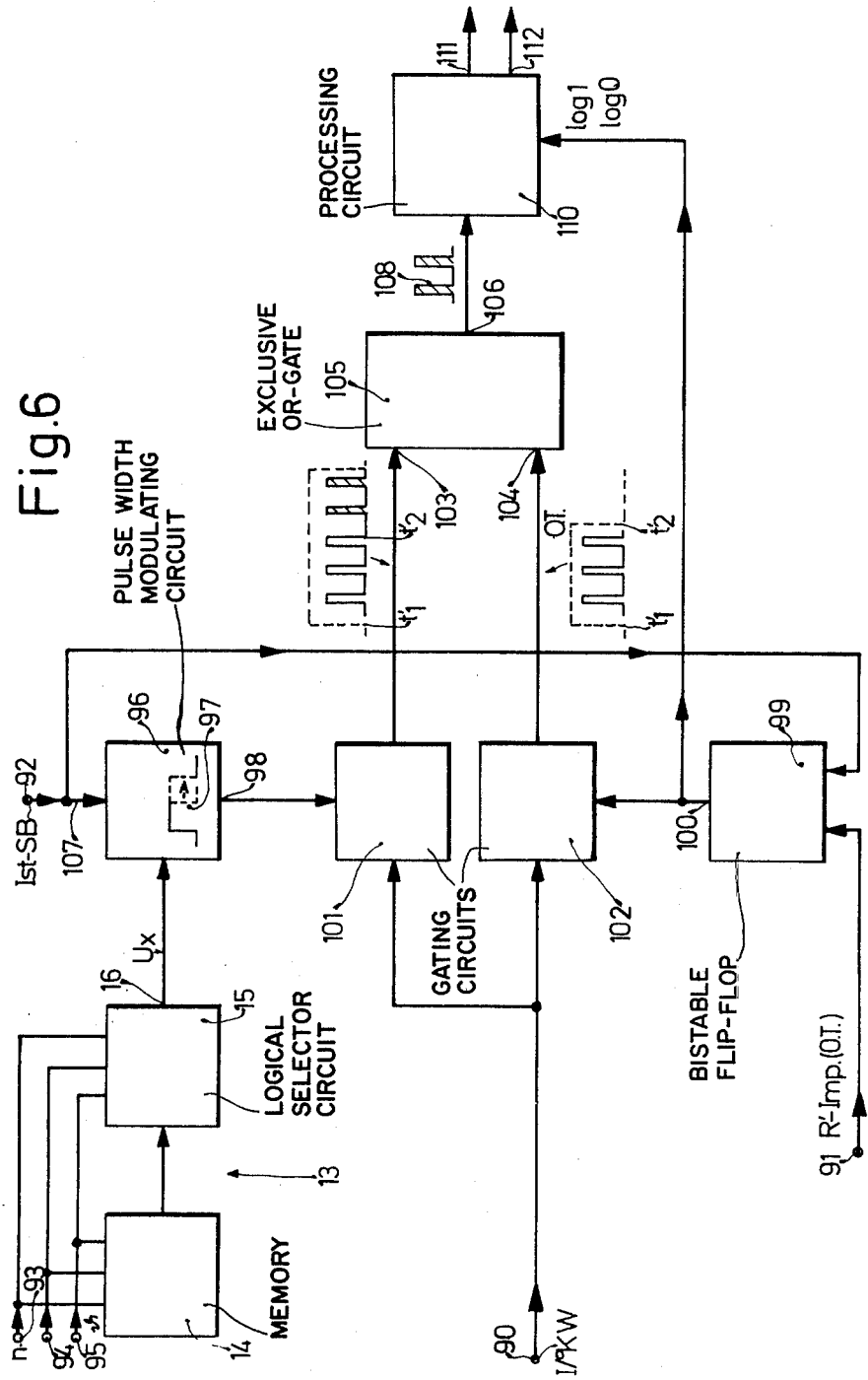

METHOD AND APPARATUS FOR CONTROLLING THE ONSET OF FUEL INJECTION IN DIESEL ENGINES

BACKGROUND OF THE INVENTION

The invention relates to a method and an apparatus for controlling the operation of a Diesel engine. More particularly the invention relates to a method and an apparatus for controlling the onset of fuel injection in Diesel engines so as to obtain optimum operation in dependence on external requirements over the entire operational domain of the engine. The method and apparatus of the invention further provide the selection of an optimum operational point and a set-point signal related thereto which is compared with the actual injection timing in order to provide a corrective signal.

STATE OF THE ART

The invention is closely related to known systems for changing the onset of injection in diesel motors for the purpose of improving power and decreasing the generation of noise, preferably automatically. In these known systems the onset of injection may be changed during changes in engine speed. The known injection timers usually include a centrifugal governor or a hydraulic mechanism for changing the relative position of the drive shaft of the fuel injection pump with respect to the drive means and thus alter the injection timing. In some distribution pumps, a hydraulic regulator changes the pump pressure in rpm-dependent manner and thus changes the position of a roller carrier ring. A known mechanism for changing the onset of injection is described for example in U.S. Pat. No. 3,906,916. The known systems permit a load-dependent adjustment via a bypass system. However the known systems are incapable of providing optimum control of the onset of injection in Diesel engines to the degree required to meet present-day demands in modern engines. One of the main disadvantages of the known injection systems is that the actual injection timing, i.e., the onset of fuel delivery, is not under direct control. What the known systems actually change is the onset of fuel delivery which does not take into account the variations introduced by the passage of fuel through conduits, etc., and thus introduces imprecise actuation and comprises in accuracy.

OBJECTS AND ADVANTAGES OF THE INVENTION

It is thus a principal object of the invention to provide a method and apparatus for controlling the actual fuel delivery timing and a closed control loop. The present novel method and apparatus make it possible not merely to place the onset of injection at a point which permits a thermodynamically favorable combustion onset with increasing rpm but, in addition thereto, permit changing the onset of injection while considering such other important variables as for example the emission of toxic components through the exhaust, the noise generation, and fuel consumption, to name just a few. Any number of previously measured engine characteristics may be placed in a memory and may be exploited for the formation of a nominal or set-point value for the onset of fuel injection at or near which the engine is then operated by the closed loop, feedback control system. Thus the apparatus of the invention permits an optimum control of the onset of injection while taking into account substantial operational variables of the engine and further permits a selection of characteristic curves, or branches of such curves, for the formation of the set-point value. It is thus possible to provide an ideal mixture preparation system which is finally attuned to whichever of several variable is deemed to be the most important, i.e., low consumption, low noise generation, low smoke formation, maximum torque, and the like. This type of multiply optimum control permits a very effective exhaust gas clean-up by subjecting the heretofore imprecise injection timing to a very precisely operating closed-loop control system which furthermore permits compensation for the time taken by the fuel pressure wave to traverse various passages and also compensates for any effects of wear and tear.

It is a useful and practical feature of the invention that permits an external selection of the particular characteristic domains which are of special importance for each case. If there is no external action, for example by switching, then a logical selection circuit within the apparatus of the invention operates according to a program and automatically selects a desired set-point value in dependence on the prevailing operational variables.

A very favorable further development of the invention includes construction the majority of the control system to operate digitally and to use a clock pulse train which has a specific number of pulses for each degree of crankshaft rotation.

Inasmuch as it is desired that the set-point generator produce an analog voltage and because the inputs to this set-point generator are normally also analog signals, it is necessary to provide a phasing circuit which interspaces the analog set-point signal into the crankshaft rotation-related cycle of the system so as to permit a comparison between the set-point signal and the actual value of the control variable which is detected by a suitable transducer at the instant of fuel injection.

The invention will be better understood as well as further objects and advantages thereof become more apparent from the ensuing detailed description of preferred embodiments taken in conjunction with the drawing.

BRIEF DESCRIPTION OF THE DRAWING

FIG. 4 illustrates a circuit which is connected behind the circuitry of FIGS. 3a and 3b and which serves for the transformation of the control deviation into a voltage suitable for actuating the final control element;

FIG. 6 is a block diagram of a second exemplary embodiment of an electronic control system which operates on the principle of pulse width modulation.

DESCRIPTION OF THE PREFERRED EMBODIMENTS

Figure 1:
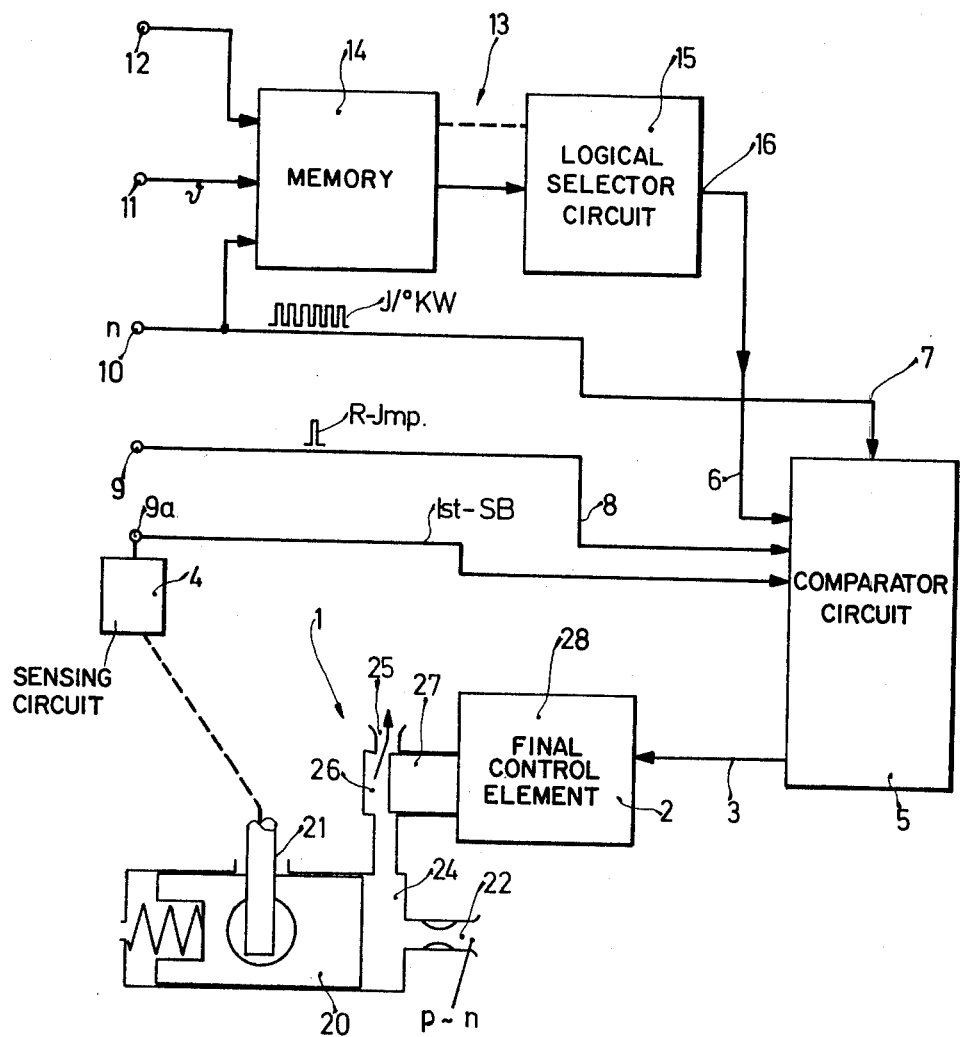
FIG. 1 is a simplified overall block diagram of an electronic control for determining the onset of injection in a Diesel engine.

The basic principle of the control process which is the subject of the present invention and which serves to adjust the onset of injection of fuel for Diesel engines on the basis of a set-point value in a closed feedback loop will now be discussed with the aid of the simplified block diagram of FIG. 1. In FIG. 1 the part of the apparatus which is associated with the final control element that actually sets the onset of fuel injection is designated with the numeral 1 and includes a final control element 2 which is actuated via a line 3 to vary the timing of fuel injection within the limits which are normally set for the operation of Diesel engines. In the illustrated exemplary embodiment, the injection timing is changed hydraulically which will be discussed in greater detail below. However, any other suitable method or apparatus which can be controlled by a control signal and which serves to shift the onset of fuel injection either forward or backward relative, for example, to the top dead center position of the engine piston, would be suitable. There is also provided a sensing circuit 4 which is capable of detecting the actual moment of fuel injection and which is thus suitably located in the vicinity of the injection nozzle or nozzles and is preferably so embodied as to generate an electrical pulse when fuel injection begins. The pulse generated by this sensor is thus a datum which relates the actual value of the start of injection and will henceforth be referred to as the Ist-SB-pulse. The Ist-SB-pulse is fed to a comparator circuit 5 that also receives, for example, a signal related to the preferred set-point value of fuel onset for a particular operational point of the Diesel engine. Furthermore, the comparator circuit 5 also receives an rpm signal delivered via a line 7 which is preferably an oscillating signal train that delivers for example one pulse per degree of crankshaft rotation. The comparator circuit 5 further receives via a line 8 a reference signal, preferably a pulse, which occurs at some point prior to the top dead center position of the engine crankshaft and earlier than the earliest fuel injection onset which can occur prior to top dead center. This reference pulse, subsequently referred to as an R pulse, is delivered to an input 9 of the overall circuit while the rpm signal, subsequently referred to as I/°KW, is obtained at the input 10 of the circuit. The circuit 13 has two further inputs 11 and 12 to help in generating a set-point value for the angle at which fuel injection is to begin. The input 11 for example may receive a signal proportional to temperature $\theta$ while the input 12 may receive a load-dependent signal, for example proportional to the fuel quantity Q per stroke, subsequently referred to as a Q/H signal.

Figure 2:
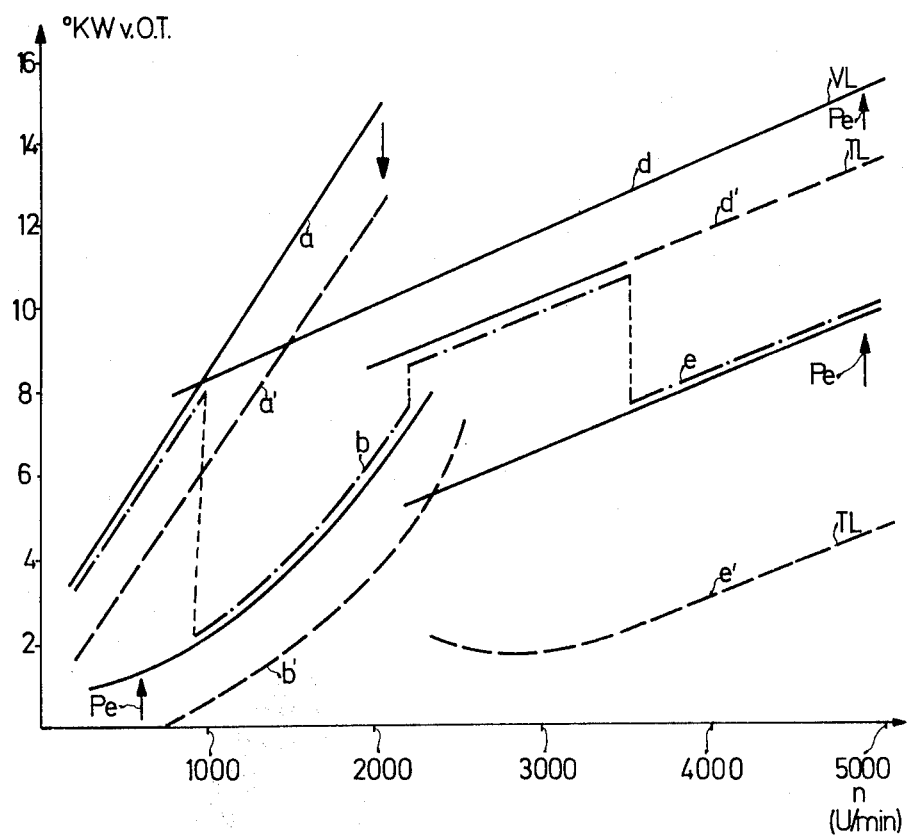
FIG. 2 is a diagram showing the characteristic curves from which a selection circuit derives the optimum fuel injection point for any operational point of the engine.

The set-point generating circuit 13 includes a storage or memory 14 which suitably contain a variety of optimum characteristic curves associated with important parameters that affect the timing of the onset of injection. These characteristic curves may be stored in analog or digital form using, for example, solid state memories or function generators. Suitably and advantageously, the operational parameters of the engine are delivered to this set-point generating circuit 13 in analog form and the selected data for each operational state of the engine are then fed to a subsequent selector circuit 15 which decides the particular characteristic curve to be used for each operational state. These matters will be discussed in more detail with the aid of FIG. 2. At its output 16, the logical selector circuit 15 generates a set-point signal which may be fed to the comparator 5 and may be in any form, for example coded digitally or as an analog voltage and may not yet be related to engine speed at this stage of the process.

Generally speaking, the system according to the present invention for feedback control of the onset of injection in Diesel engines is based on the processing of pulse trains and individual pulses so that it is possible and desirable to employ digital integrated circuits. The set-point signal present on the line 6 is subjected in the preferred exemplary embodiment to a change related to the prevailing engine rpm with the aid of counter circuits.

Before describing the central element of the electronic injection control circuit, it would be suitable at this point to describe the peripheral groups of the system, for example those circuit sensors and control elements which detect external information and provide it to the controller and those which receive the final control signal for actually changing the timing of the onset of fuel injection.

The first of these peripheral systsms to be discussed will be the final control element 1. It is assumed that the Diesel engine in which the present invention is to be employed includes a fuel injection system of known construction which is provided with a so-called roller support ring that can be azimuthally adjusted to change the relative angle with respect to the drive means of the injection pump and thereby changes the effective onset of injection in this commonly used distributive injection pump. The distributive injection pump further includes a piston 20 which is coupled to the roller support ring at a point 21 and which is engaged by an engine speed-dependent pressure P at a point 22 and rotates the roller support ring 21 as a function of the pressure P. The present invention makes it possible to completely dispense with the engine speed-dependent and hydraulic control commonly used in these distributor pumps. Preferably however, this relatively coarse pre-control process is retained, for example for the case in which the electronic control system becomes inoperative. In such case, the onset of injection may still be changed as a function of engine speed.

It is a feature of the present invention that the pressure chamber 24 within the known and existing distributive injective pump is provided with a pressure relief line 25 whose flow cross section 26 is changeably determined by a valve slide 27 depending on the magnitude of the control deviation within the control loop of the present invention. The valve slide 27 may be actuated as shown by a solenoid 28 and can change the cross section 26 and thereby the pressure in the change 24 and hence also the onset of fuel injection by continuous motion in the opening or closing sense of the channel 25. The changing pressure in the chamber 24 then sets a particular position of the piston 20 which, in known manner, also sets an angular position of the roller support ring, thereby setting the correct onset of fuel injection. The solenoid 28 may be energized continuously by a D.C. signal or may be energized cyclically, preferably at a frequency so high that the valve slide 27 assumes an oscillation-free position which is proportional to the control deviation. However, it is also possible to alternately and rapidly completely close and open the drain 25 so as to obtain the desired average pressure in the chamber 24 and in that case the inertia of the various components would serve to smooth out pressure fluctuations.

The rpm signal is a pulse train whose frequency is chosen to correspond to the desired accuracy; in the present preferred embodiment, the pulse train has one pulse per degree of crankshaft rotation. The means for generating these pulses need not be discussed in detail; for example the pulse generator could be a rotating part of the crankshaft provided with for example 360 gear teeth which pass an inductive sensor and thereby generate the desired pulse train I/°KW whose frequency is one pulse per degree of crankshaft rotation. Finally, the input 9 receives the above-mentioned reference marker which serves to set the digital circuitry to be described at a particular time or to initiate arithmetic processes for determining the degree of control deviation. The reference marker R occurs once for each crankshaft revolution at a time which is farther from top dead center than any possible shift of the onset of injection ahead of the top dead center position of the related engine cylinder. The information related to the occurrence of the onset of injection, i.e., the Ist-SB pulse, is fed to an input 9a by the sensor 4 which should be located near an injection nozzle so as to eliminate the effect of delays in the conduits. Any suitable mechanism for generating the Ist-SB pulses is possible, provided it is constructed so as to sense the exact moment of injection and can generate a pulse that may be used by other components of the system. The important feature of the sensor is that it must deliver the electrical pulse precisely at the onset of the true fuel injection process. Any influence of temperature or a shift of the zero level of such a sensor is of no importance for the subsequent circuitry because it is only the dynamic properties, i.e., the time of occurrence which is processed by the circuits of the invention. It should be noted that because 4-cycle engines inject fuel only during every second crankshaft revolution, two injection nozzles each having a half wave rectifier circuit may be combined in a full wave rectifier to provide the desired signal when the engine has an even number of cylinders.

The temperature signal fed to the input 11 of the set-point generator 13 may be obtained in known manner, for example with a temperature-dependent resistor (NTC resistor) or in some similar manner; the presence of the temperature signal $\theta$ is important however, especially during cold engine starts and for optimum high speed running where the onset of injection must be drastically changed.

Finally, the input 12 of the set-point generator circuit 13 receives a load-dependent signal which is obtained as a signal proportional to the fuel quantity and represents a good measure of the load on the engine. This signal may be taken, for example, from the position of the control rack of a serial injection pump or the control slide in a distribution pump. More precise and thus more expensive methods for measuring the fuel quantity are also possible and known.

The instantaneous angular position of the crankshaft is defined jointly by the passage of the marker pulse R and the number of pulses received from the passage of the pulse R until a particular time, from the pulse train I/°KW. This measurement is present for all engine speeds and permits the association of a particular angular crankshaft position with the desired injection onset, i.e., the set-point signal as well as the actual injection signal, i.e., Ist-SB pulse.

Figure 5:
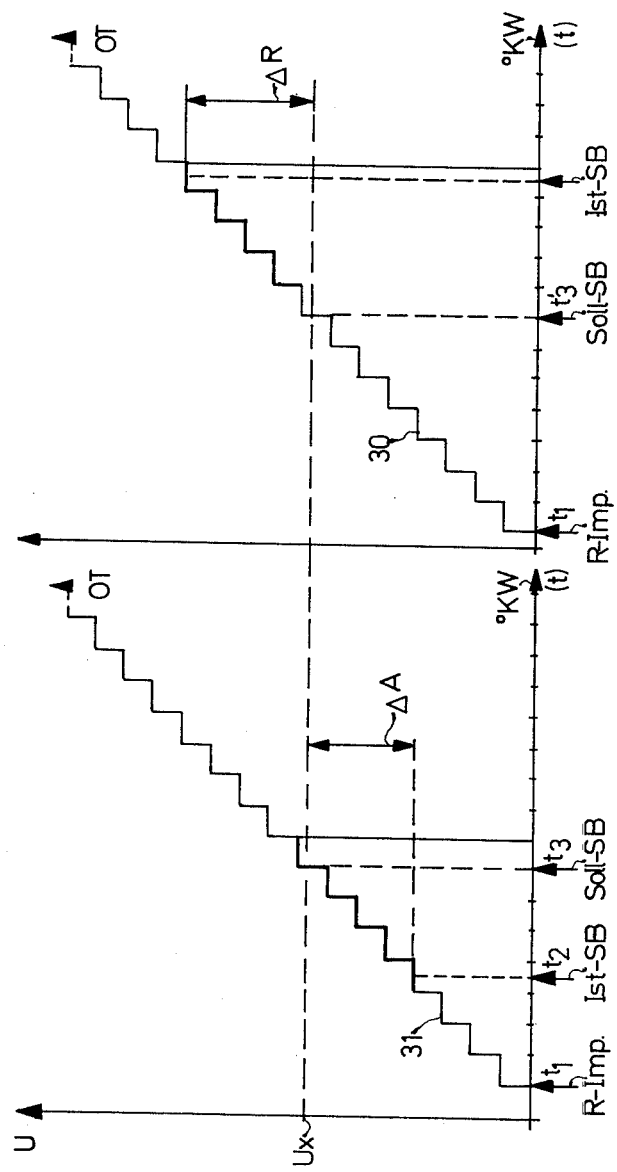
FIG. 5 is a diagram illustrating the function or the preferred embodiment of the invention for early fuel injection (left portion of the diagram) and late fuel injection (right portion of the diagram)

It is instructive at this point to provide an illustration of how the control deviation is detected. Referring to FIG. 5, there will be seen two different curves relating to an onset of injection which is too early in the left half of the figure and too late in the second half of the figure with respect to the set-point timing. As already explained, the circuits of the present invention operate in substantially digital manner, i.e., the important variables, for example the rpm signal I/°KW, the reference marker signal R-Imp and the actual value signal Ist-SB all appear as pulses or pulse trains, i.e., in effectively digital form. The diagram on the left side of FIG. 5 shows various voltages as a function of time, or more exactly as a function of the angular measure in degrees of crankshaft rotation (°KW), and a set-point voltage $U_X$ is shown as provided by the logical selection circuit 15 from the characteristic data set in the memory 14. The reference marker occurring at the time $t_1$ serves as the zero marker for the subsequent counting process and for the determination of the control deviation. At the time $t_1$, the reference marker pulse R causes a first counter, for example a common up-counter 30 (see also FIG. 3b) to initiate a counting process while the instantaneous contents of the counter 30 are transformed into an analog step curve as shown in FIG. 5, for example with the aid of a digital-to-analog converter 32. Inasmuch as the set-point voltage $U_X$ is also an analog signal, the two voltages may be compared so as to obtain at the time marked $t_3$ or $t_3$, in FIG. 5 where these two voltages are equal, and at which time a set-point pulse, subsequently referred to as Soll-SB, is generated.

If, for example, the onset of injection is earlier than actually required by the set-point value, the actual value detector 4 generates an Ist-SB pulse at a time $t_2$ and while the counter 30 is counting and starts a synchronous up-down counter 35. Both counters 30 and 35 are counting a pulse train which is preferably an rpm-dependent signal pulse train as supplied to the input 10 of FIG. 1. In the left half of the diagram of FIG. 5, where the injection onset is assumed to be early, the process is as follows. At the time $t_1$, the counter 30 counts upwardly while at the time $t_2$ the up-down counter 35 starts to count in the same direction until, at the time $t_3$, the contents of the counter 30 are equal, after analog comparison, to the set-point value derived from the operational variables and the characteristic data set. At this time, $t_3$, the set-point pulse, i.e., the Soll-SB pulse, occurs and is used for stopping and erasing the contents of the up-counter 30 while stopping the up-down counter 35 in its counting process. As a result, the contents of the up-down counter 35 are a direct indication of the number of angular units by which injection took place too early. This content is the control deviation $\Delta A$ and is fed to the final control element either as an analog or a digital value. The counter 30 is kept erased until the cycle initiated by the next R marker at the time $t_1$ but the contents of the up-down counter 35 are retained to serve as a control parameter, especially at low rpm, because the processing of the control deviation can be performed in arbitrary manner and it will be preferably performed as further explained in connection with FIG. 4. The right half of the diagram of FIG. 5 illustrates a process in which the onset of injection occurs too late. In that case, the set-point pulse Soll-SB arrives at a time $t_3$, i.e., ahead of the actual value pulse Ist-SB. In this case, the early arrival of the Soll-SB pulse causes the up-down counter 35 to count the rpm signal in the opposite direction as that in which the counter 30 is being counted and the later arriving Ist-SB pulse then stops the counting process in the up-down counter. Thus the contents of the up-down counter always indicate the control deviation and, in the preferred exemplary embodiment, the up-down counter is not normally erased so that the control deviation occurring for each cycle is maintained for the purpose of integration.

Figure 3A:
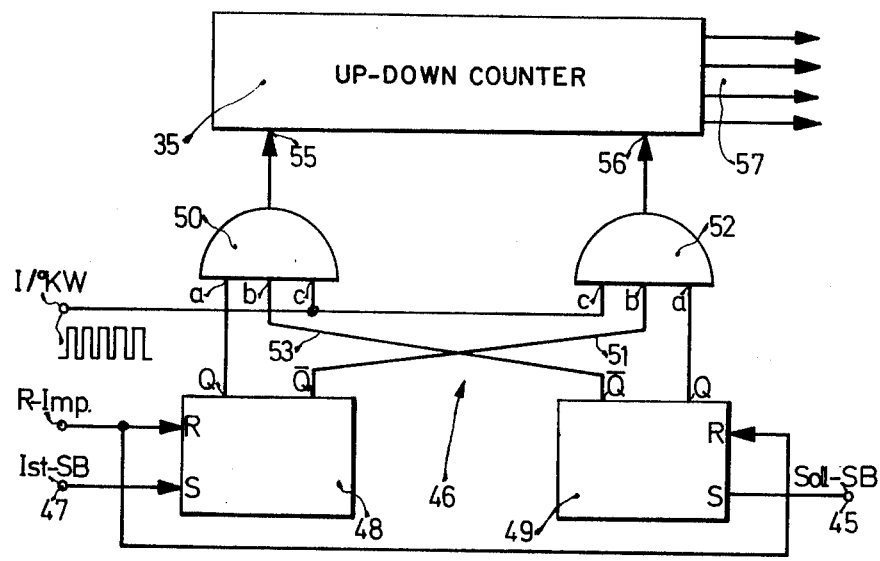
FIGS. 3a and 3b show preferably digital electronic circuit components for interspacing the set-point value with the engine cycle and for generating a set-point pulse and for comparing set-point signal and the actual value signal for initiating fuel injection.
Figure 3B:
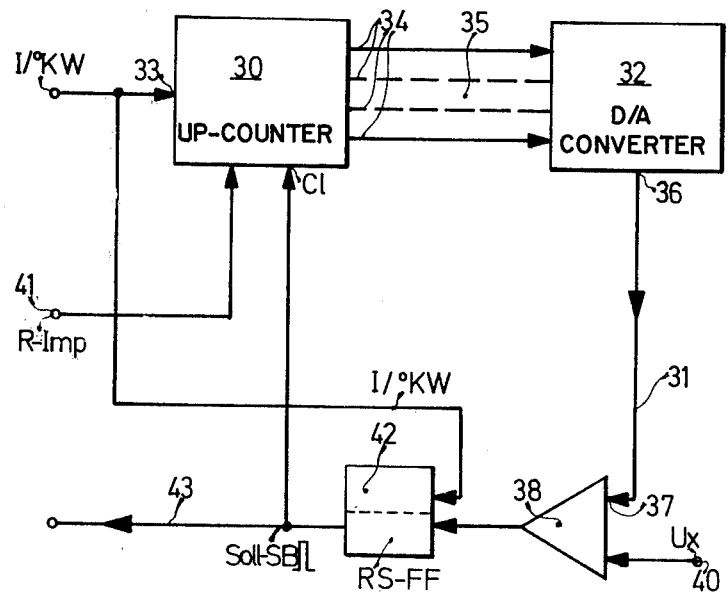

A central feature of this part of the apparatus is to take the analog set-point voltage $U_X$ which is generated by the circuit 13 and to place it within the time domain which begins with the arrival of the reference marker R at a time $t_1$ and extends, for example, up to the top dead center position of the piston in such a way that further subsequent logical circuits are able to determine which of the two pulses, i.e., the actual value pulse Ist-SB or the set-point pulse Soll-SB, occurred earlier and at the same time to measure the angular distance between these two pulses. This distance or delay which is the actual control deviation is then further processed to cause the control loop to diminish the deviation. In a first exemplary embodiment of the present invention, the positioning of the set-point pulse Soll-SB in the correct time slot with respect to the crankshaft position as well as the measurement of the control deviation is performed with the aid of circuits that are illustrated in FIGS. 3a and 3b and which will be discussed in detail below. It is expressly stated at this point that these circuits are merely an exemplary embodiment for illustrating the operation in principle and that this operation may also be obtained by similar and equivalent circuit components or circuits.

The placement of the set-point pulse Soll-SB in the correct time slot with respect to the crankshaft angle as well as the measurement of the control deviation is performed for example by a circuit as illustrated in FIGS. 3a and 3b. In that example, the set-point is an analog value which is a D.C. voltage generated by the set-point generator circuit 13 and provided to the input 40 of the circuit of FIG. 3b. As already mentioned, the reference marker pulse R which is fed to the input 41 and which defines the zero or starting point of this system, causes the counter 30 to count upwardly at the frequency fed to the input 33 which is related to the engine speed (rpm) and may have a frequency of, for example, one pulse per angular unit, for example one pulse per degree of crankshaft rotation. The counter contents which are present at the outputs 34 of the counter are fed through lines 35 to a subsequent digital-to-analog converter 32 which may be for example a resistor matrix coded in suitable manner so that the output 36 of the D/A converter generates the analog step voltage 31 in FIG. 5. This curve represents a quantized and increasing D.C. signal which is fed to one input of a subsequent comparator 38 whose other input receives the analog voltage $U_X$ present at the contact 40. When the magnitude of the step curve 31 is equal to the set-point voltage $U_X$, the comparator 38 generates the previously referred to set-point pulse Soll-SB. This pulse is fed via the circuit 42 to the reset input C1 of the counter 30, thereby erasing the contents of the counter and preparing it for the next operating cycle. The circuit 42 must hold the Soll-SB pulse until all stages of the counter are definitely cleared even if the signal at the comparator 38 disappears. In the preferred embodiment this is done by setting a bistable flip-flop which is reset by the subsequent pulse from the rpm frequency I/°KW. The correctly positioned set-point pulse Soll-SB is then fed via a line 43 to the input 45 of a logical circuit 46 whose second input 47 receives the Ist-SB pulse, i.e., the pulse which defines the actual onset of injection. The output potential of the logical circuit 46 changes depending on which of these two input pulses comes first, i.e., it is a discriminator circuit which can distinguish if the Ist-SB pulse is earlier or later than the set-point pulse and can also provide information as to the time delay (or the crankshaft angle) between the occurrence of the two pulses. In the illustrated exemplary embodiment, the logical control circuit 46 includes two bistable flip-flops 48 and 49, embodied as so-called RS flip-flops, in which the set inputs S are given, respectively, the Ist-SB pulse and the Soll-SB pulse. The reset inputs are connected to the time marker R so that at the beginning of the cycle, both flip-flops are in their initial and identical state. Let it be assumed as a convention that, the actual value pulse arrives ahead of the set-point pulse, the up-down counter 35 will count in the increasing direction whereas, when these two pulses arrive in the reverse order, the up-down counter will count downwardly. This means that is referred to this particular example, the $\overline{Q}$ outputs of both flip-flops 48 and 49 are reset, i.e., they carry a logical 1 or high signal after the arrival of the R pulse. When the actual value (Ist-SB) arrives at the set input of the flip-flop 48, it switches over into its second state and its output Q carries a logical 1 as does the input "a" of a subsequent NAND gate 50 while at the same time, the output $\overline{Q}$ of the flip-flop 48 carries a logical 0 which is transmitted via the line 51 to a subsequent AND gate 52 connected behind the flip-flop 49. Due to the cross connection provided by the lines 51 and 53, from the $\overline{Q}$ outputs of the flip-flops 48 and 49 to the central inputs "b" of the AND gates 50 and 52, it is possible to let one flip-flop be affected by the output of the other. When the actual value pulse (Ist) arrives earlier, the input "a" of the AND gate 50 carries a logical 1 as does the input "b" if the flip-flop 49 has not yet been set. The inputs "c" of both AND gates 50 and 52 receive the counting pulse train I/°KW so that the up-counting input 55 of the subsequent up-down counter 35 receives the counting frequency. However, as soon as the set-point pulse (Soll-SB) arrives at the input 45, the flip-flop 49 is also set and its output $\overline{Q}$ goes to logical 0. At that time, the transmission of the counting pulses to the up-down counter 35 is interrupted and its contents are exactly identical to the control deviation $\Delta A$ as already discussed in connection with FIG. 5. Similar remarks apply when the actual value pulse arrives after the set-point pulse, i.e., when the onset of fuel injection is late, which means that the control deviation $\Delta A$ of the up-down counter 35 is counted downwardly by the appropriate number of pulses. The outputs 57 of the up-down counter 35 thus always carry a specific value which is processed in order to actuate the final control element as will be discussed below in connection with FIG. 4. The downward counting input of the up-down counter 35 is labeled 56.

A possible modification of the apparatus so far described is to use an arbitrary frequency as the counting frequency for the counters 30 and 35 rather than an rpm-dependent one. In that case, the control deviation is no longer dependent on engine speed. It is also conceivable to use a digital set-point value by digitizing the set-point derived from the characteristic data field by means of an analog-to-digital converter whose output frequency is related to the counter input frequency and the correct positioning of the set-point pulse is performed by means of digital comparison circuits.

The contents of the up-down counter 35 which represent the control deviation $\Delta A$ are processed in the shown exemplary embodiment by a circuit illustrated in FIG. 4. This circuit uses the contents of the counter 35 to generate a control pulse for the final control element, i.e., in the present case for the coil of the electromagnet 28. It has already been explained that, in the normal case, the up-down counter 35 will carry an average (mean) content which is corrected during each operating cycle either in the upward or downward direction so that the algebraic sign of the control deviation is always accounted for. The counter 35 acts as an integrating control member or a memory and the subsequent circuit of FIG. 4 is so constructed as to supply to the solenoid 28 a cyclic control signal whose pulse-width-ratio is changed by the contents of the up-down counter 35 so that, on the average, the pressure medium acting on the control piston 20 will be changed accordingly.

The circuit according to FIG. 4 is thus an apparatus which is best described as a converter for converting a digital counter content into a pulse-width-ratio or keying-ratio. The previously described up-down counter 35 which occurs in the circuit of FIG. 3a has been redrawn in FIG. 4 and its content is taken via line 60 to a subsequent downcounter 61 at such times when the contents of the counter 35 are not changing. The manner and repetition rate of the processing of the counter contents are suitably made independent of the rate at which the contents are changing as a function of engine speed. In the present example, the electromagnet 28 is actuated by the output stage of the circuit by means of an oscillating signal whose frequency is so high that the value slide 27 occupies an essentially constant position without oscillating. The change of this position of the valve slide is due to a change in the pulse-width-ratio or keying-ratio of the rectangular pulse train fed to the electromagnet 28. In order to generate this pulse train, there is provided a pulse generator 62 which produces a pulse train of predetermined frequency. In the present example that frequency is 1600 Hz and this signal is fed to a line 63 to a frequency divider circuit 64 where the frequency $f_A$ is reduced by the factor 16 so that the output frequency $f_T$ of the divider circuit 64 is now 100 Hz. There is also provided a differentiating circuit or logical selector circuit consisting of a capacitor 65 and a resistor 66 permitting a subsequent bistable flip-flop 67 to be controlled by pulses received at its set input S. Let it be assumed, as an example, that when the $f_T$ pulse occurs, i.e., when the flip-flop 67 is set, its Q output carries a logical 1 or a positive voltage. This voltage controls the solenoid 28. The contents of the counter 61 now determine at which time within the duration of the period of the 100 Hz frequency $f_T$ the flip-flop 67 will be reset at its R input by the counter 61 via the line 68. As previously mentioned, the output frequency $f_A$ produced by the frequency generator 62 is 16 times greater than the frequency $f_T$ which interrogates the counter 61 and which, at the same time, is the control frequency for the solenoid 28 of the final control element 1. The output frequency $f_A$ of the frequency generator 62 goes via the line 69 to a gate circuit 70 and hence to the downward counting input 71 of the down-counter 61. Sixteen pulses may arrive at the counting input 71 of the counter 61 before the occurrence of another pulse of the frequency train $f_T$ for setting the flip-flop 67. If it is assumed that the maximum count in the up-down counter 35 is 4 bits and if it is further assumed that, in the normal case, the up-down counter has an average content, then it will be seen how the circuit of FIG. 4 works because, after approximately eight pulses at the counting input 71, the down-counter 61 is counted out until its content is zero and its output now generates the reset pulse for the flip-flop 67 which at this time changes its Q output to a logical 0. Subsequently, eight more pulses of the high frequency $f_A$ will occur until the flip-flop 67 is again set by the next $f_T$ pulse. It may thus be seen that when the counter contents are an average value (8) there is obtained a pulse width ratio of 1:1. In other words, the magnet 28 is energized during the first half period of the $f_T$ oscillation and remains current-free during the second half period.

As the average counter content of the up-down counter 35 changes or as the total received by the down-counter 61 changes accordingly, the pulse width ratio or keying ratio is shifted so that the average time of energization of the electromagnet 28 is increased or decreased, thereby resulting in a changed average position of the valve slide 27 and a changed average opening cross section 26 for permitting fluid to drain and thus alter the otherwise rpm-dependent pressure within the hydraulic system for changing the onset of fuel injection. The overall function is thus a closed-loop control with feedback.

Another possibility for generating the above-mentioned pulse width ratio would be the use of a "1 of $f_A/f_T$ decoder" instead of the counter 61 or a parity check of the counter contents in the counters 35 and 64.

In certain operational states of the Diesel engine it is possible that there is no injection whatever, for example in downhill operation. This would mean that the control loop would run up to its one extreme terminus and when the fuel injection pulses reoccur, the control process would not at first be able to operate properly. In order to overcome this deficiency, the circuit shown in FIG. 4 also includes a bistable flip-flop 75 which is actuated by a pulse from the up-down counter 35 that is delivered whenever the counter content is maximum and which occurs at the output 60a. This bistable flip-flop 75 then assumes an output state which is transmitted to the counter 35 via a line 77 and causes the latter to receive a predetermined average content or number from a jamming circuit, not further described, while at the same time blocking both up and down counting inputs 55 and 56. As soon as fuel injection reoccurs, the bistable flip-flop 75 is reset at an input 79, for example from the actual value pulse (Ist pulse) and the up-down counter 35 is released. As a result, during downhill operation or engine overrunning, the engine operates in simple open-loop forward control.

It will be appreciated that the final control element 1 or its equivalent could also be actuated and controlled in an entirely analog manner, for example by converting the counter contents of the up-down counter 35 by means of a D/A converter. The output of this D/A converter would then be a continuous voltage which, after suitable amplification if necessary, would be used to actuate the final control element.

It is an additional function of the gating circuit 70 of FIG. 4 to block the transmission of further counting pulses of the frequency $f_A$ to the down-counter 61 when the bistable flop-flop 67 has been flipped into its second state by a reset pulse delivered to the line 68. In that case, the gate 70, which in the present example is a NAND gate is then blocked via a line 80 from receiving further counting pulses. The manner of operation of the set-point generating region 13 will be better understood by referring to the diagram of FIG. 2 which will now be discussed.

The various curves a, a' to e and e' represent curves which relate the onset of injection in degrees of crankshaft position ahead of top dead center to the engine speed n in rpm. Each of these characteristic curves or branches of curves relates to particular operational states and is associated with desired characteristics of the engine. These are the characteristic curves for the onset of injection which are programmed ahead of time into the circuit 14 which is associated with the set-point generating circuity 13. These various characteristic curves relate to different optimized criteria of engine operation and, once selected, the operational state may be obtained from them as a function of engine speed. For example, the characteristic curve a which is shifted with increasing temperature into a curve a' relates the onset of injection during starting and acceleration of a cold engine for a maximum torque. The characteristic curve b, which was obtained by load-dependent parallel displacement from the curve b', is responsible for a minimum of noise generation in the engine. The characteristic curve d', which for increasing load from a partial load TL to full-load VL shifts parallel into a characteristic curve d, is related to minimum specific fuel consumption, while the characteristic curves e' to e and all curves in-between, each parallel to the other, as a function of increasing engine torque, are responsible for obtaining minimum exhaust coloration, i.e., minimum smoke generation and generally low emission of toxic substances. Naturally, these characteristic curves contained in the circuit 14 may also include a number of other branches and other programmed conditions and dependencies which might include other operational criteria such as low fuel consumption, low emission, low noise, maximum torque, etc. The programming of these characteristic curves into the device 14 may occur in known manner and need not be discussed in detail. For example, the device 14 may be a solid state memory or it may be a suitable function generator, etc. This device 14, which will subsequently be referred to as operational data storage, is followed by a selection circuit which sets suitable priorities to select one or the other of the characteristic curves to provide maximization of the desired parameter. For example, it selects a set-point value which changes the onset of fuel injection as a function of engine speed and which at the same time follows the dash-dotted line in FIG. 2 which is seen to follow first one and then the other of various branches of characteristic curves. In this example, the selected operation would first follow a part of the curve a at low temperature and during engine run-up at full load. Subsequently, approximately beginning at 1,000 rpm, a switchover occurs to an onset of injection which is related to minimum noise generation. During the medium rpm domain and with a warmed-up engine and partial load, the onset of injection set-point is selected to move along the branch d' where a minimum fuel consumption is obtained whereas, beginning with an upper rpm value, a selection is made to a branch which provides the lowest amount of smoke generation. The set-point value obtained in this way would be a D.C. voltage present at the output 16 of the selector circuit 15 and which is then processed in the way described previously. It will however be understood that the selection of the set-point may also be made purely digitally, for example by addressing a solid state memory in suitable manner where these addresses are derived from the prevailing values of external parameters of the engine. The data storage then provides, possibly under the influence of a selection circuit, digitally coded words of, for example, 8 bits, which contain the set-point information and it is transmitted to the logical comparator circuit 5. The selected set-point words then could be used to place a value in a counter which is counted down at the counting sequence and where a set-point pulse is generated when the counter has zero content.

In the present exemplary embodiment as described above, the set-point value is an analog voltage, i.e., a quasi-D.C. signal whose amplitude is a measure of the set-point itself. If the characteristic data is stored digitally, this analog set-point voltage may be generated by the use of a D/A converter, for example one yielding up to 16 output voltages which would then correspond to the 16 degrees of angle lying ahead of top dead center in the present example.

SECOND EXEMPLARY EMBODIMENT

FIG. 6 illustrates a control system for setting and changing the onset of fuel injection which is based on the principle of pulse width modulation and which varies in several important points from the first exemplary embodiment of the control system described previously.

The input data fed to the control system of FIG. 6 again includes a pulse train which is speed-dependent, i.e., it carries a predetermined number of pulses for each unit of crankshaft rotation, preferably one pulse per degree of crankshaft rotation. This pulse train (I/°KW) is fed to the input 90. A further pulse, which may also be called a reference pulse, is derived at some position of the crankshaft, in the present embodiment preferably the top dead center position. This reference pulse is designated R'-Imp and is fed to the input 91. The input 92 receives the pulse defining the actual onset of injection, i.e., a pulse from a transducer, previously referred to as an actual value pulse (Ist-SB) and the inputs 93, 94 and 95 receive respectively an rpm signal, a load signal and a temperature signal. The set-point generating circuits are again designated 13 and they need not be described in further detail because they may be identical to those previously described and they include the previously mentioned operational data generator 14 and the subsequent, or parallel, logical selection circuit 15 whose output 16 carries a D.C. voltage proportional to the set-point value. There is provided a circuit 96 which receives the set-point voltage $U_X$ and generates from it a width-modulated pulse 97. The basic principle of the control system of this second embodiment is that the set-point value is generated from varying pulse widths which are compared with a constant pulse width that is related to the actual value signal. In other words, the timing circuit or the pulse width modulator 96 generates a pulse at its output 98 whose width or length is proportional to the amplitude of the set-point voltage $V_X$. Such generators or modulators are known and will not be explained in detail, for example they may be embodied as a simple monostable element whose storage element receives the voltage and is charged thereby and whose discharge time is then proportional to the total charge received. When the monostable element returns to its stable state, a subsequent bistable flip-flop may be reset into its original state after having been initially set by the starting flank of the set-point pulse. The occurrence of the set-point pulse is determined by the occurrence of the actual value pulse fed to the input 92 so that the angular location of the set-point pulse with respect to the crankshaft position is thus fixed. The actual value pulse also triggers a bistable flip-flop 99 into one of its switching states, for example one in which the output 100 carries a positive voltage, i.e., the logical state 1. The bistable flip-flop 99 is reset by the reference pulse R'-Imp at the moment the crankshaft reaches top dead center. The outputs 98 and 100 of the pulse width modulator 96 and the bistable flip-flop 99 act on subsequent gating circuits 101 and 102, respectively, which gating circuits receive the rpm-dependent clock pulse train related to crankshaft speed, i.e., the pulse train I/°KW. The outputs of the two gating circuits which are embodied as AND gates are connected with the two inputs 103 and 104 of the subsequent anti-equivalence gate or an exclusive OR gate 105 whose output 106 carries the control deviation signal.

The circuit of the second embodiment illustrated in FIG. 6 functions as follows. The bistable flip-flop 99 is set by the arrival of the actual value pulse and its output 100 opens up the subsequent gating circuit 102 so that the pulses I/°KW may reach the input 104 of the anti-equivalence gate. The bistable flip-flop 99 is always reset by the R'-Imp pulse when the crankshaft reaches top dead center so that the duration of the switching state logical 1, i.e., the pulse width at the output of the flip-flop circuit 99, is an immediate measure of the number of degrees of crankshaft rotation by which the actual value pulse occurs ahead of top dead center. However, the actual value pulse is also fed via line 107 to the pulse width modulator circuit 96 which opens up the subsequent gating circuit 101 so that, at the same time as the actual value pulse Ist-SB, the rpm-dependent pulses I/°KW reach the two inputs of the anti-equivalence gates via the gating circuits 101 and 102. It is a known function of an anti-equivalence gate to cancel pulses which arrive simultaneously so that the output does not respond to such events. In the representation of FIG. 6, the simultaneously occurring first three pulses after the time $t_1'$ when the actual value pulse occurs, until the time $t_2'$ (reaching of top dead center), are shown without shading.

In the hypothetical case viewed here, the set-point proportional voltage $U_X$ demands that the effective onset of injection begin five pulses ahead of top dead center, which is indicated by the fact that the pulse at the output 98 of the pulse width modulator 96 endures for two further counting pulses of the pulse train I/°KW before the gate circuit 101 finally closes. Therefore, two additional "set-point pulses" reach the input 103 of the anti-equivalence gate 105 and as shown in the drawing are also carried at the output 106. Thus in the hypothetical example shown, the effective onset of injection is two crankshaft pulses, i.e., two degrees of crankshaft rotation too late. In this way, the anti-equivalence gate 105 is seen to make a comparison between the actual and the set-point values so that the output pulse of the pulse width modulator 96 may be called a "set-point pulse width" whereas the output of the bistable flip-flop 99 may be called an "actual value pulse width".

The number of supplemental pulses which is passed by the gate circuits 101 and 102 and which represents the control deviation is proportional to the difference between the length of the actual value pulse and the set-point pulse. However, this difference only results in obtaining the absolute value of the deviation and not its algebraic sign, i.e., direction. The latter information may be obtained however from a determination which of the two pulses at the outputs of circuits 99 or 96 lasted longer. For example, in the embodiment illustrated, if the set-point pulse was longer than the actual value pulse, the onset of injection would have been too late while, in the opposite case, it would have been too early. Which of these conditions actually occurred may be derived by relating the arrival of the pulses at the output 106 of the anti-equivalence gate 105 which are marked 108 to the switching state at the output of the bistable flip-flop 99. When the control deviation pulses 108 arrive at a time when the output of the bistable flip-flop 99 has a logical 0, then these pulses are obviously coming from the circuit 101 which is controlled by the pulse width modulator 96 and the effective onset of injection took place too late and must be adjusted in the direction of earlier injection. If, however, the pulses 108 arrive when the output of the bistable flip-flop 99 is a logical 1, then the injection must be adjusted toward a later onset. The appropriate control signal may be generated in a simple manner with a logical coupling circuit, for example an AND gate, which receives the output signals from the anti-equivalence gate 105 and from the bistable flip-flop 99. This AND gate may be a part of the subsequent processing circuit 110 whose output 111 carries a signal containing the magnitude of the control deviation and whose output 112 carries a signal related to the algebraic sign of that deviation. These two signals can be further processed in various ways, for example as before by controlling an up-down counter whose counting input receives the pulses 108 related to the control deviation magnitude and whose up-down control input receives the sign indicating the direction of the control deviation which is present at the output 112 of the circuit 110. The further processing of these signals will take place in a manner already described in connection with FIG. 4 where, finally, an analog type control element, in this case a magnet 28, is actuated. However, the output of the circuit 110 may also be used to activate an electronic control circuit including a stepping motor and a switching mechanism for initiating forward or backward control. The pulses related to the control deviation may also be used directly for controlling final control elements in the direction set by the signal indicating the algebraic sign of the deviation.

The generation of the particular set-point value to correspond to selected optimum criteria which is done automatically by the selection circuit 15 may also be done externally and possibly manually, for example by the driver or operator of the vehicle equipped with the engine. The driver would then make a decision as to which of the curves or branches of curves of FIG. 2 he would employ for the operation of the motor.

The present invention may thus, in summary, be characterized as an apparatus which controls the injection timing in Diesel engines by setting the onset of fuel injection in a genuine closed control loop including feedback. This manner of operation permits engine control in optimum manner and independent of any effects of aging or other influences. It is a particular advantage of the method and apparatus described herein that the actual value signal of the control variable which is subject to variation is the actual onset of fuel injection, i.e., a signal coinciding with the instant of fuel injection. The use of relatively simple and reliable sensors and transducers permits the generation of a pulse as the actual value control signal which is completely insensitive to shifts in the zero level or temperature influences, and the like. The onset of injection sensing pulse may be generated by sensing an electrical change or a pressure change taking place within the injection nozzle or in its vicinity when injection begins.

The apparatus and circuitry of the present invention may be advantageously employed in conjunction with and as a supplement to the hydraulic pre-control system in known distributive fuel injection pumps in which a piston experiences a pressure related to engine speed and thereby sets a mechanical element which changes the onset of fuel injection. This system may also be used in conjunction with a serial injection pump having a hydraulic adjustment of the onset of injection. This type of association with known injection pumps has several advantages, the principal one being very great mechanical reliability so that even during malfunctions of the electronic portion of the system, the Diesel engine may be operated without difficulty. Furthermore, the mechanism required for changing the onset of injection is relatively small and the dynamic operation of the control mechanism need not be monitored by path indicators or the like, resulting in considerable savings of space and expenditure.

The control systems described by the present invention automatically compensate for the delay experienced by the pressure wave in the injection conduits as well as any changes taking place during operation, for example changes in temperature, fuel density, changes in the seating of nozzle springs, a change of the fuel flow and similar short or long-term changes. Because of this automatic compensation of all these factors, the fuel injection system achieves long term reliability yet is easily replaceable.

It is a substantial characteristic of the present invention that the precision in the determination of the onset of injection is related to the exact determination of the set-point value which, in turn, is generated from the instantaneous operating variables of the engine, for example engine speed (rpm), load, temperature, etc., and may thus be adapted to the type or application of the particular engine, for example stationary or vehicle use as well as to various rules and regulations related to exhaust emissions, etc., simply by changing the data contained in the characteristic data storage. The characteristic data which are related to obtaining a minimum of emission or some other optimum property can be individually selected and tailored and are stored in a possibly exchangeable module while the selection among the different data sets is made according to the desired priority of the various operational domains. This change may be done arbitrarily by the vehicle operator or automatically when certain limits of maximum or minimum values of the various operating parameters are reached.

The invention makes possible the consideration and processing of a large number of operational parameters and to cause them to influence the onset of fuel injection. One of these parameters, for example, is the load, which is monitored as the fuel consumption per stroke and this measurement is normally available in air or fuel control systems. The prevailing temperature of the Diesel engine may be determined simply and reliably with the use of an NTC resistor. A single transducer can generate a signal related to engine speed as well as the relative crankshaft position.

The transducer which generates the reference markers, either for indicating top dead center or some position further ahead of top dead center than the earliest possible onset of injection, can be disposed for example on the cam shaft of the engine and may be adjusted with respect to the characteristics of the injection nozzles. It may also be attached to the crankshaft and may in fact be incorporated in the rpm angle sensor by generating an irregular pulse when the desired marker is reached.

The above-described control systems advantageously employ digital processing within the controller or the pulse processing circuits, for example as illustrated in FIG. 6. Digital processing is compatible with counting of the crankshaft angle in degrees and the desired onset of injection is constant in time. Furthermore, the pulses are easy to generate and are effectively used and the control deviation itself may be stored as a digital counter content which can be interrogated as often as necessary.

It has been mentioned that the generation of the set-point value and its further processing may also be done digitally. However, for the set point an analog manner of generation is preferred because the signals related to the operational engine variables which are used for the set-point generation are almost always analog signals which can be particularly simply and rapidly received by analog circuitry. The required transformation into an analog value can always take place by the use of a simple resistor network, for example as illustrated in the D/A converter 32 of FIG. 3b. Analog-to-digital converters are not required and the characteristic data curves may be stored in the characteristic data storage, for example with the use of operational amplifiers.

It is worth repeating that the content of the up-down counter used may be relatively small, for example containing only 16 counts. Any error indication may result in counter overflow or underflow and permits suitable processing.

The control system according to the invention may be used for generating an analog control parameter for actuating an analog but cyclically operating final control element. However, the digitally derived and stored control deviation may be used to actuate a stepping motor via suitable circuitry.

The novel control system according to the present invention may be used for any type of Diesel engine.

The foregoing relates to preferred exemplary embodiments of the invention, it being understood that other embodiments or variants thereof are possible within the spirit and scope of the invention.

What is claimed and desired to be secured by Letters Patent of the United States is:

1. A method for controlling the timing of fuel injection in a Diesel engine in dependence on external operating conditions, whereby fuel is supplied under pressure from a fuel supply pump to at least one fuel injection nozzle, comprising the steps of:
  (a) storing engine operational data in a set-point generating circuit;
  (b) sensing at least rpm and load data of the engine and supplying said sensed data to the set-point generating circuit as a result of which the set-point generating circuit generates a set-point value signal determinative of the desired onset of fuel injection:

(c) generating, at a predetermined instant in the crankshaft rotation, a reference value pulse signal in synchronism with the crankshaft rotation;

(d) scanning the operation of the at least one fuel injection nozzle and generating, as an angularly-proportional signal representative of the start of fuel injection, an actual value pulse signal;

(e) generating a set-point value pulse signal from the reference value pulse signal and the set-point value signal;

(f) generating a control deviation of the onset of fuel injection relative to the set-point value signal as a function of the reference value pulse signal, the actual value pulse signal and the set-point value pulse signal, said control deviation having a magnitude and algebraic sign determined by the occurrence of the actual value pulse signal and the set-point value pulse signal relative to the reference value signal; and adjusting the setting of the onset of fuel injection of a final control element in accordane with the magnitude and algebraic sign of the control deviation to thereby reduce the magnitude of the deviation.

2. A method as defined by claim 1, wherein said set-point value pulse signal is made to occur at a chosen time prior to the top dead center position of an engine piston and at a point which is ahead of the actual onset of injection.

3. A method as defined by claim 1, wherein said set-point value pulse signal and said actual value pulse signal are identified with pulses defining the angular position of the crankshaft and wherein the distance between said set-point value pulse signal and said actual value pulse signal defines the degree of crankshaft rotation which is equal to the control deviation.

4. A method as defined in claim 1, wherein there is provided a first counter receiving a pulse train whose frequency is related to engine speed and in particular produces one pulse per unit of crankshaft angle, said counter being started by the arrival of said reference value pulse signal and the contents of said counter being converted by a digital-to-analog converter into an analog step voltage, said step voltage being continuously compared with said set-point value signal and wherein when said analog voltage and said set-point value signal coincide, said set-point value pulse signal is generated indicating the correct moment of initiation of fuel injection and said counter is stopped.

5. A method as defined by claim 1, further comprising the steps of:

(h) counting pulses synchronous with the crankshaft rotation supplied to an up-down counter during the duration of a time interval occurring between the set-point value pulse signal and the actual value pulse signal; and (i) determining from the counted pulses whether the set-point value pulse signal or the actual value pulse signal arrives earlier.

6. A method as defined by claim 5, wherein the prevailing content of said up-down counter is an immediate measure of the integrated control deviation which is stored until the next operating cycle, said content of said up-down counter being counted down at a constant frequency and at a constant repetition rate to thereby produce a rectangular pulse train whose pulse width ratio (keying ratio depends on said content of said up-down counter.

7. A method as defined by claim 6, wherein, when the contents of said up-down counter are equal to half its capacity, the rectangular pulse train has a substantially symmetric pulse width ratio and wherein said rectangular pulse train is used for the cyclic actuation of the final control element that adjusts the onset of fuel injection and wherein the frequency of said rectangular pulse train is chosen so that the final control element exhibits a substantially analog control function.

8. A method as defined by claim 1, wherein the engine operational data comprises a plurality of characteristic curves relating the onset of fuel injection as a function of engine speed for a variety of optimized operational states, said operational data being stored in a suitable storage means of the set-point generating circuit, and wherein particular ones and particular portions of said characteristic curves are selected depending on a desired operational behavior of the engine and are used to generate an analog or digitally coded set-point value pulse signal.

9. A method as defined by claim 8, wherein the selection of the particular one of the various characteristic curves stored in the storage means may be made from outside of said system and in arbitrary manner.

10. A method for controlling the timing of fuel injection in a Diesel engine in dependence on external operating conditions, whereby fuel is supplied under pressure from a fuel supply pump to at least one fuel injection nozzle, comprising the steps of:

(a) storing engine operating data in a set-point generating circuit;

(b) sensing at least rpm and load data of the engine and supplying said sensed data to the set-point generating circuit as a result of which the set-point generating circuit generates a set-point value pulse signal;

(c) generating, at a predetermined instant in the crankshaft angle, a reference value pulse signal in synchronous with the crankshaft rotation;

(d) scanning the operation of the at least one fuel injection nozzle and generating, as an angularly-proportional signal representative of the start of fuel injection, an actual value pulse signal;

(e) triggering two switching components, which are switchable into at least two switching states, by the actual value pulse signal;

(f) resetting one of the switching components into its original switching state by the reference value pulse signal, said reference value pulse signal occuring at a predetermined crankshaft angle corresponding to top dead center;

(g) resetting the other switching component into its original state by the set-point value pulse signal such that one actual value pulse of a given width and one set-point value pulse of a given width are formed;

(h) detecting the mangitude and algebraic sign of a control deviation from the lengths of the actual value pulse and the set-point value pulse, whereby the algebraic sign is determined from the pulse of longer duration at that time; and (i) adjusting the setting of the onset of fuel injection of a final control element in accordance with the magnitude and algabraic sign of the control deviation to thereby reduce the magnitude of the deviation.

11. A method as defined by claim 10, further comprising the steps of:

(j) generating an rpm signal as an oscillating signal train synchronous with crankshaft rotation, and supplying said rpm signal to two gate circuits; and (k) triggering the two gate circuits by the pulse width modulated actual value pulse, wherein the output pulses are cancelled when identical and, when not identical, the remanent pulse constitutes the control deviation.

12. An apparatus for determining the variable onset of injection in Diesel engines, whereby fuel is supplied under pressure by a supply pump to at least one injection nozzle, comprising:

(a) a set point value signal generating circuit to which at least rpm and load data of the engine, which are detected by external sensors, are supplied;

(b) a memory apparatus, which is associated with the set-point value signal generating circuit and contains stored information and, depending on external engine data supplied, generates a variable set-point value signal;

(c) a reference value pulse signal generating apparatus, which at a predetermined instant in the crankshaft rotation generates a reference value pulse signal (R-Imp) synchronous with the crankshaft rotation;

(d) an actual value pulse signal generating sensor circuit, which generates, as an angularly proportional signal representative of the onset of fuel injection, an actual value pulse signal;

(e) a set-point value pulse signal generating circuit connected to the set-point value signal generating circuit and to the reference value pulse signal generating apparatus for generating a set-point value pulse signal (Soll-SB) from the reference value pulse signal and the set point value signal;

(f) a control deviation generating circuit connected to the reference value pulse signal generating circuit, the actual value pulse signal generating circuit and the set-point value pulse signal generating circuit for generating a control deviation of the onset of fuel injection relative to the set-point value signal as a function of the reference value pulse signal, the actual value pulse signal and the set-point value pulse signal, said control deviation having a magnitude and algebraic sign determined by the occurrence of the actual value pulse signal and the set-point value pulse signal relative to the reference value pulse signal; and (g) a control apparatus connected to the control deviation generating circuit for adjusting the onset of fuel injection in accordance with the magnitude and the algebraic sign of the detected time interval between the actual value pulse signal and the set point value pulse signal.

13. An apparatus as defined by claim 12, wherein the memory apparatus comprises data storage means for storing data relating the onset of fuel injection to engine speed for a variety of optimized conditions and a variety of different operational states and wherein the control deviation generating circuit comprises a logical selector circuit which receives data relating to instantaneous engine variables and selects from said data stored in said data storage means the set-point value signal for the optimum onset of fuel injection.

14. An apparatus as defined by claim 13, wherein said logical selector circuit may be operated externally and arbitrarily.

15. An apparatus as defined by claim 12, further comprising pulse generator means for generating a clock pulse train synchronous with crankshaft rotation and generating a predetermined number of pulses for each unit of crankshaft rotation.

16. An apparatus as defined by claim 15, wherein the reference value pulse signal generating apparatus comprises means for generating a reference marker to generate the reference value pulse when said crankshaft passes a particular location.

17. An apparatus as defined by claim 16, wherein the actual value pulse signal generating sensor circuit includes a transducer means disposed in the vicinity of the injection nozzle of said engine for generating the actual value pulse signal at the moment of onset of fuel injection.

18. An apparatus as defined by claim 17, wherein said engine is provided with a distributor injection pump including means for changing the onset of fuel injection, said means including a hydraulic piston actuated by rpm-dependent pressure, and said apparatus comprising a final control element connected to said logical selector circuit and receiving therefrom a preferably cyclic output signal for altering the pressure engaging said piston in said hydraulic adjustment circuit independently of changes provided as a function of engine speed by said fuel injection pump.

19. An apparatus as defined by claim 18, wherein said final control element is an electromagnet with an associated valve slide, said valve slide variably obturating a drain in the control pressure chamber of said hydraulic adjustment system in said fuel injection pump to thereby continuously change said pressure in accordance with the deviation of the control loop.

20. An apparatus as defined by claim 12, further comprising a comparator receiving an analog set-point signal from said set-point value signal generating circuit and comparing it with the output voltage of a digital-to-analog converter which receives as its input the contents of an up-counter which is clocked at a frequency proportional to engine speed.

21. An apparatus as defined by claim 20, wherein the reference value pulse signal generating apparatus comprises means for generating a reference marker when the crankshaft of the engine passes a particular point, said reference marker causing said up-counter to begin counting and causing said digital-to-analog converter to thereby generate said comparison voltage, said reference marker being generated at a point lying further ahead of top dead center than the earliest possible onset of fuel injection, and wherein when the set-point value signal supplied to said comparator equals the comparison voltage which is proportional to the contents of said counter, said comparator produces an output signal which is interspersed in the pulse train related to engine speed and defining crankshaft position.

22. An apparatus as defined by claim 12, wherein there is provided a timing comparison circuit for measuring the relative delay between said set-point value pulse signal and said actual value pulse signal to thereby provide a measure of the control deviation.

23. An apparatus as defined in claim 12, wherein the control deviation generating circuit includes: an up-down counter; and wherein the apparatus further comprises:

(h) a pulse generator for generating a clock pulse train (I/°kw) synchronous with crankshaft rotation, said up-down counter being triggered, for a duration determined by the time interval between the occurrence of the actual value pulse signal and the set-point value pulse signal, by the clock pulse train, whereby the counting direction determines which of the actual value pulse signal and the set-point value pulse signal has arrived earlier in time.

24. An apparatus as defined by claim 23, wherein said up-down counter is an integrating part of said control system and its contents immediately exhibit the magnitude and direction of the control deviation, and said apparatus further comprising a circuit which receives the contents of said up-down counter and generates therefrom a pulse-width-modulated control voltage which is supplied to a final control element for adjusting the onset of fuel injection.

25. An apparatus as defined by claim 24, wherein said digital comparator circuit includes two bistable flip-flops which are reset by said reference pulse, one of which receives at its set-input said actual value pulse and the other of which receives at its set-input said set-point pulse and wherein the outputs of said bistable flip-flops are fed crosswise to digital gating circuits which control the passage of the crankshaft-synchronous clocking pulse train to said up-down counter.

26. An apparatus as defined by claim 25, wherein said digital gating circuit includes two AND gates each having inputs "a", "b" and "c", and wherein each input "c" receives the counting pulse train synchronous with crankshaft rotation whereas the inputs "a" receive the output signal of the associated bistable flip-flop whereas the inputs "b" receive the output of the bistable flip-flop associated with the other of the two AND gates.

27. An apparatus as defined by claim 26, wherein said converter circuit for changing the digital contents of said up-down counter into a rectangular pulse train with changing pulse width ratio includes a totalizing counter which cyclically receives the contents of said up-down counter and which is counted down at a relatively high frequency until its own content is zero, and where there is connected behind said totalizing counter a bistable flip-flop which is reset when said totalizing counter has content zero and where said bistable flip-flop is set by a setting pulse derived by dividing said counting frequency, whereby the output of said flip-flop generates a rectangular voltage which is used to control the final control element which changes the fuel injection timing and wherein the pulse width ratio of the output of said flip-flop is determined by the content of said up-down counter.

28. An apparatus as defined by claim 27, further comprising a pulse generator for generating the counting frequency ($f_A$) and a frequency divider circuit for dividing said frequency ($f_A$) to thereby generate a pulse train ($f_T$) for setting said bistable flip-flop, said frequency ($f_A$) being fed to said totalizing counter via a gating circuit, the state of said gating circuit being determined by the switching state of the bistable flip-flop reset by said totalizing counter.

29. An apparatus as defined by claim 27, further comprising a flip-flop circuit (75) having two switching states and connected to block the counting input of said up-down counter and placing in said counter an average counter content which is maintained until an actual pulse arrives; whereby said switching circuit opens said control loop and operates the timing of the onset of fuel injection on the basis of said average value.

30. An apparatus as defined by claim 27 further comprising a blocking circuit for blocking the counting process of said up-down counter when the maximum content of said up-down counter has been reached during an upward count and until such time as the associated maximum set-point signal permits downward counting.

31. An apparatus as defined in claim 27, further comprising a circuit for checking the parity of the contents of said counter and said frequency divider circuit.

32. An apparatus as defined in claim 31, further comprising a blocking circuit for blocking the counting process of said up-down counter when the maximum content of said up-down counter has been reached during an upward count and until such time as the associated maximum set-point signal permits downward counting.

33. An apparatus as defined by claim 31, further comprising a first circuit (96) for transforming a set-point pulse into a pulse width modulated set-point pulse and further comprising a circuit (99) for generating a pulse-width-modulated actual value pulse, both circuits being triggered at the time of occurrence of the actual value pulse, and both circuits (96 and 99) feeding pulses of variable width to a discriminator circuit (101,102,105) which processes the pulses of different length length and derives therefrom the magnitude of the control deviation and derives the direction of the control deviation from determining which of the pulses is the longer.

34. An apparatus as defined by claim 33, wherein said circuit (99) for generating the pulse-width-modulated actual value pulse is a bistable flip-flop (99) triggered by the actual value pulse and reset by a reference marker pulse related to the top dead center position of the crankshaft, and wherein said discriminator circuit includes two gating circuits (101, 102) which are controlled by the relative length of said variable-width actual value pulse and said variable-width set-point pulse and which transmit a pulse train related and synchronous with crankshaft position to an anti-equivalence gate (105) whose output pulses are a measure of the control deviation.

35. An apparatus as defined by claim 34, wherein the output of the bistable flip-flop (99) used in the generation of the variable width actual pulse and the pulses (108) related to control deviation are used in a subsequent circuit (110) to define the direction of the control deviation.

36. An apparatus as defined by claim 35, wherein the output of said anti-equivalence gate (105) is fed to said up-down counter (35) whose counting direction is determined from the state of said bistable flip-flop (99).

37. An apparatus as defined by claim 35, wherein the output pulses (108) of said anti-equivalence gate (105) are used to actuate a stepping motor associated with the final control element of said apparatus, for adjusting the fuel injection timing, the direction of rotation of said stepping motor being determined by the output signal from said bistable flip-flop (99).

38. An apparatus for determining the variable onset of injection in Diesel engines, whereby fuel is supplied under pressure by a supply pump to at least one injection nozzle, comprising:
(a) a set-point generating circuit to which at least rpm and load data of the engine, which are detected by external sensors, are supplied, said set-point generating circuit including a memory apparatus containing stored information and, depending on external engine data supplied, said set-point generating circuit generates a variable set-point value signal (Ux);

(b) a reference value signal generating apparatus, which at a predetermined instant in the crankshaft rotation, generates a reference value pulse signal (R-Imp) synchronous with the crankshaft rotation;

(c) an actual value pulse generating sensor circuit, which generates, an angularly-proportional signal representative of the onset of fuel injection, an actual value pulse signal;

(d) a first switching element connected to the set-point generating circuit and to the actual value pulse generating sensor circuit, for converting the supplied set-point value signal (Ux) into a modulated set-point value pulse;

(e) a first switching element connected to a reference value signal generating apparatus and to the actual value pulse generating sensor circuit, for generating an actual value pulse having a variable pulse duration, whereby both switching elements are switchable by the actual value pulse signal into a first switching state;

(f) a discriminator circuit connected to the first and second switching elements for detecting a control deviation and its direction, from the differing pulse lengths of the set-point value pulse and the actual value pulse; and (g) a control apparatus connected to the discriminator circuit for adjusting the onset of fuel injection in accordance with the magnitude and the algebraic sign of the detected control deviation.

* * * * *